United States Patent [19]

Atsumi et al.

[11] Patent Number: 4,510,355
[45] Date of Patent: Apr. 9, 1985

[54] ROTARY SHAFT - PUSH BUTTON SWITCH ANCHOR ASSEMBLY

[75] Inventors: Haruo Atsumi, Otsu; Haruyuki Koizumi, Kyoto, both of Japan

[73] Assignee: Omron Tateisi Electronics Co., Kyoto, Japan

[21] Appl. No.: 557,409

[22] Filed: Nov. 30, 1983

Related U.S. Application Data

[63] Continuation of Ser. No. 328,682, Dec. 8, 1981.

[30] Foreign Application Priority Data

Dec. 15, 1980 [JP] Japan .................................. 55-177534

[51] Int. Cl.$^3$ .......................... H01H 3/16; H01H 3/54
[52] U.S. Cl. .................................... 200/47; 200/331; 200/338; 403/354; 403/381
[58] Field of Search ................ 200/47, 153 T, 153 N, 200/307, 330, 331, 337, 338, 340; 403/333, 354, 381

[56] References Cited

U.S. PATENT DOCUMENTS

| 561,855 | 6/1896 | Baptist | 403/331 X |
| 1,899,846 | 2/1933 | Boyd | 403/331 |
| 3,721,782 | 3/1973 | Roumagnac | 200/47 |
| 4,058,339 | 11/1977 | Burchard, Jr. | 403/331 X |
| 4,133,991 | 1/1979 | Takase | 200/47 |
| 4,303,815 | 12/1981 | Ishikawa | 200/330 |

FOREIGN PATENT DOCUMENTS 1002943 9/1965 United Kingdom ............... 403/331

Primary Examiner—John W. Shepperd
Assistant Examiner—Renee S. Kidorf
Attorney, Agent, or Firm—Wegner & Bretschneider

[57] ABSTRACT

A switch assembly comprises a push-button switch and a switch operating mechanism including an actuator and a plunger for transmitting the movement of the actuator to the push button to operate the push-button switch. While one end of the plunger is operatively associated with the actuator, the other end of the plunger is rotatably and removably, but axially non-movably, coupled to the free end of the push button. For this purpose, the other end of the plunger is formed with a radially outwardly extending anchor flange while the free end of the push button is formed with a generally U-shaped anchor recess for receiving the anchor flange therein.

4 Claims, 2 Drawing Figures

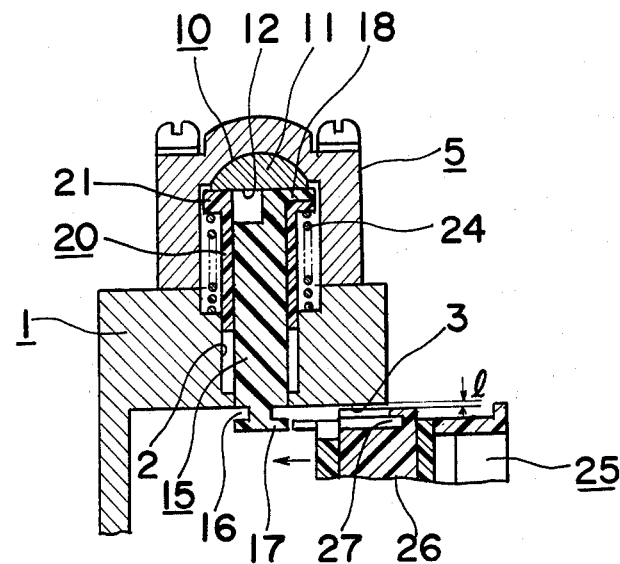
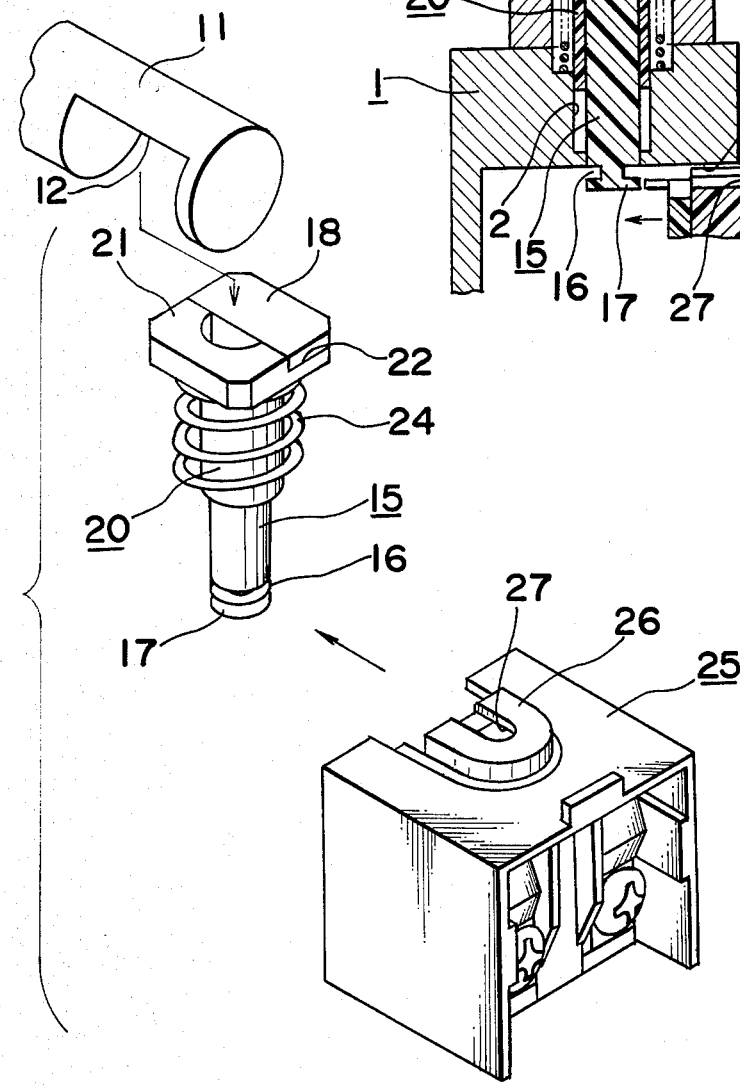

ROTARY SHAFT - PUSH BUTTON SWITCH ANCHOR ASSEMBLY

This application is a continuation of U.S. application Ser. No. 328,682 filed Dec. 8, 1981.

The present invention generally relates to a switch assembly and, more particularly, to a limit switch assembly of a type comprising a push-button switch built in a switch casing and having a push button, and a switch operating mechanism including an actuator supported in a head mounted on the switch casing and a plunger for transmitting the movement of the actuator of the push button to operate the built-in switch.

The limit switch assembly of the type referred to above has long been well known in the art. However, since the prior art limit switch assembly is designed such that, for transmitting the movement of the actuator to the push button of the built-in switch, the plunger is merely held in end-to-end abutting relation to the push button, it has often happened that, when the switch assembly is to be dismantled for servicing and/or for changing one of the operative capabilities of the switch operating mechanism and when the head is removed from the switch casing for this purpose, some component parts of the switch assembly, for example, the plunger and its associated biasing spring, tend to scatter under the influence of the force exerted by the biasing spring and, at worst, one or more component parts are likely to be lost.

In order to avoid this disadvantage, there has been proposed a switch assembly with a means for preventing the particular component parts from falling off the head, but this proposal has rendered the switch assembly as a whole to be complicated in structure and high in manufacturing cost.

The present invention has, therefore, been developed with a view to substantially eliminating the above described disadvantages and inconveniences and has for its essential object to provide an improved switch assembly wherein a simple and inexpensive structure is employed to avoid any possible fall-off of the particular component parts which would otherwise occur when the head is separated from the switch casing.

This and other objects and features of the present invention will become apparent from the following description taken in conjunction with a preferred embodiment thereof with reference to the accompanying drawings, in which:

FIG. 1 is a side sectional view of a limit switch assembly embodying the present invention; and FIG. 2 is a perspective view of component parts, in an assembled condition, of a switch operating mechanism used in the limit switch assembly, which component parts are shown in relation to a push-button switch.

Referring to the accompanying drawings, a limit switch assembly embodying the present invention comprises a switch casing 1 having a through-hole 2 defined in a wall portion of the casing 1 and having a removable head 5 mounted on the wall portion of the casing 1 in alignment with the through-hole 2 by means of one or more fastening elements, for example, set screws. With head 5 when so mounted defines a chamber of generally square cross-section therein in cooperation with the wall portion of the casing 1. Extending rotatably into the head 5 in a direction transversely of the longitudinal axis of the through-hole 2 is a rotary shaft 10 having its outer end portion adapted to receive through an actuator lever (not shown) a rotating force necessary to rotate such shaft 10 and its inner end portion terminating inside the head 5. The inner end portion is formed into an actuating stem 11 of generally crescent or semicircular cross-section having a flank 12 lying parallel to the longitudinal axis of the shaft 10.

Extending axially movably and rotatably through the through-hole 2 and terminating in contact with the flank 12 in the actuating stem 11 within the head 5 is a generally cylindrical plunger 15 forming a part of the switch operating mechanism together with the rotary shaft 10. This plunger 15 has a lower end situated on the side of the wall portion of the casing 1 opposite the head 5 and formed with a circumferentially extending annular recess 16 to provide a radially outwardly protruding anchor flange 17 for engagement with a built-in push-button switch 25 in a manner as will be described later. The opposite, upper end portion of the plunger 15 situated within the head 5 has a generally rectangular flange 18 formed integrally therewith and protruding radially outwardly therefrom, said rectangular flange 18 being shaped in a manner as will be described later.

The switch operating mechanism also comprises a sleeve 20 housed movably within the head 5 and supporting the upper end portion of the plunger 15 therethrough. As best shown in FIG. 2, the sleeve 20 has an upper end formed integrally with a radially outwardly protruding flange 21 of a shape which may be similar to the cross-sectional representation of the chamber defined in the head 5. The radially outwardly extending flange 21 is so recessed at 22 that, when the plunger 15 is inserted through the sleeve 20 with the flap 18 held in contact with the flap 21, the assembly of the plunger 15 and the sleeve 20 can represent the shape as if constituted by a bolt having a stepped stem and a square flat head, as can be understood from FIG. 2. However, it is to be noted that the plunger 15 and the sleeve 20 are movable independently relative to each other.

The sleeve 20 is, within the head 5, normally biased to an upper position, as viewed in FIG. 1, by a biasing spring 24 encircling the sleeve 20 and extending between the flange 21 and a spring seat defined in the wall portion of the switch casing 1. The biasing force of the biasing spring 24, which is a compression spring in the embodiment illustrated, is transmitted to the plunger 15 to shift the latter upwardly.

As illustrated in FIG. 1, the flanges 18 and 21 of the respective plunger 15 and the sleeve 20 are held flat against and in contact with the flank 12 in the actuating stem 11 of the rotary shaft 10 by the biasing spring 24 while the line of separation between these flanges 18 and 21 passing across and at right angles to the longitudinal axis of the assembly of the plunger 15 and the sleeve 20 extends in parallel relation to the longitudinal axis of the shaft 10. When the switch operating mechanism is assembled as shown in FIG. 1, the switch operating mechanism may be said to be held in position to exhibit a first operative capability. In other words, the switch operating mechanism is conditioned such that, when the shaft 10 is rotated about its own axis within 180° in a clockwise direction as viewed in FIG. 1, the plunger 15 is shifted downwardly together with the sleeve 20 which is shifted downwardly against the biasing spring 24. When the shaft 10 is rotated about its own axis within 180° in a counterclockwise direction, the plunger 15 remains in the upper position by the action of a force exerted by a push button 26 of the built-in switch 25, as will be described later, but only the sleeve 20 is moved from the position towards a lower position against the biasing spring 24. This is possible because right-hand and left-hand lateral edge portions of the stem 11 on respective sides of the flank 12 transmit the rotational force of the shaft 10 to the flanges 18 and 21 respectively. This alternate downward movement of the plunger 15 and the sleeve 20 takes place even when the shaft 10 is rotated about its own axis through 360° in either direction.

However, with the switch operating mechanism constructed according to the present invention, second and third operative possibilities can be appreciated. The second operative possibility is a reverse of the first operative possibility and this can be accomplished by positioning the assembly of the plunger 15 and the sleeve 20 in such a manner that the flanges 18 and 21, which are shown as engageable respectively with the right-hand and left-hand lateral edge portions of the actuating stem 11 in FIG. 1, are held in face-to-face relation to the left-hand and right-hand lateral edge portion, respectively of the actuating stem 11.

The third operative possibility is such that the rotation of the shaft 10 in either direction within 180° results in the downward movement of both of the plunger 15 and the sleeve 20. This can be accomplished by positioning the assembly of the plunger 15 and the sleeve 20 in such a manner that the line of separation between the flanges 18 and 21 referred to above, which is shown as extending parallel to the longitudinal axis of the shaft 10, extends at right angles to the longitudinal axis of the shaft 10. This is possible because any one of the right-hand and left-hand lateral edge portions of the actuating stem 11 faces in straddling relation to the flanges 18 and 21.

Referring particularly to FIG. 2, the built-in switch 25, preferably a snap-acting push-button switch, is positioned in the switch casing 1 at a location on one side of the wall portion opposite to the head 5 with the push button 26 aligned with the plunger 15. As shown the push button 26 of the built-in switch 25 is of a configuration having a generally U-shaped anchor recess 27 engageable in the circumferentially extending annular recess 16 in the plunger 15 to receive the radially outwardly extending anchor flange 17, so that the movement of the plunger 15 effected in the manner as hereinbefore described can be transmitted to the push button 26 of the built-in switch 25 to operate the latter. Specifically, the coupling of the built-in switch 25 to the plunger 15 can be effected by inserting the built-in switch 25 into the switch casing 1 in a direction shown by the arrow in FIGS. 1 and 2 with the U-shaped anchor recess 27 aligned with the annular recess 16 and then allowing the anchor flange 17 to be received in the anchor recess 27.

In the construction described hereinbefore, and so far as the illustrated embodiment is involved, the rotation of the shaft 10 in the clockwise direction as viewed in FIG. 1 results in the downward shift of the plunger 15 accompanied by the corresponding downward movement of the push button 26 of the built-in switch 25, thereby causing the latter to assume one of at least two different switching states. However, when the force that has been applied to the shaft 10 to rotate the latter in the clockwise direction is released, the plunger 15 is upwardly shifted together with the sleeve 20 by the biasing spring 24 accompanied by the corresponding upward movement of the push button 26, thereby causing the built-in switch 25 to return to the original switching state.

Because of the axially non-detachable engagement of the plunger 15 with the push button 26, the built-in switch 25 may be of a type either wherein the push button 26 is normally upwardly biased by a built-in spring element or wherein such spring element is not employed.

The employment of the circumferentially extending annular recess 16 to define the anchor flange 17 together with the associated U-shaped anchor recess 27 is advantageous in that the switching of one of the operative capabilities of the switch operating mechanism to another can readily be facilitated without at least the plunger 15 being separated from the push button 26, that is, only by removing the head 5 from the switch casing 1 and then rotating the assembly of the plunger 25 and the sleeve 20 through 90° or 180° about the plunger 15 while the latter remains coupled to the push button 26. It is to be noted that the removal of the head 5 from the switch casing 1 does not result in the scattering of one or all of the plunger 15, the sleeve 20 and the biasing spring 24. This is because, so long as the plunger 15 is coupled to the push button 26 in the manner as hereinbefore described, the sleeve 20 urged by the biasing spring 24 to jump upwardly away from the plunger 15 is suppressed by the flange 18 held fast with the plunger 15 seated in the recess 22 in the flange 21.

Preferably, the built-in switch 25 is so positioned inside the switch casing 1 in such a manner as to form a clearance l between the undersurface 3 of the wall portion of the switch casing 1 and the top surface of the push button 26 when the push button 26 coupled to the plunger 15 is upwardly shifted with the plunger 15 held in the upwardly shifted position, although the top surface of the push button 26 may, when the push button 26 without being coupled to the plunger 15 is upwardly shifted, contact the undersurface 3 of the wall portion of the switch casing 1. By so doing, it is possible to cause the biasing force of the biasing spring 24 to be smoothly transmitted to the push button 26 through the plunger 15 to facilitate the upward movement of both of the plunger 15 and the push button 26 and also to enable the shaft 10 to assume the initial position.

From the foregoing full description of the present invention, it has now become clear that, because of the particular design used to connect the plunger 15 with the push button 26 of the built-in switch 25, the removal of the head 5 away from the switch casing 1 does not result in arbitrary scattering of the component parts of the limit switch assembly embodying the present invention.

Although the present invention has fully been described in connection with the preferred embodiment thereof with reference to the accompanying drawings, it is to be noted that various changes and modifications are apparent to those skilled in the art in the application of switches of various types. By way of example, the built-in switch 25 may not be always limited to the snap-acting push-button switch, but may be of any type so far as it has an axially movable push button.

Accordingly, such changes and modifications are to be understood as included within the true scope of the present invention unless they depart therefrom.

What is claimed is:

1. A switch assembly which comprises in combination:

(A) a switch casing having a cylindrical through hole therein and an actuator head mounted on the switch casing, said casing and head together defining a chamber coaxial with said through hole;

(B) a push-button switch having contact elements and a push button supported for movement between projected and depressed positions, said push-button switch being housed within said switch casing on one side of a wall portion of said switch casing opposite to the actuator head;

(C) a switch operating mechanism operatively housed within said actuator head and including;

(1) a rotary actuator shaft movable between at least operative and inoperative positions, said rotary actuator shaft having a flattened portion near one end thereof facing in the direction of said push button when in the inoperative position;

(D) a plunger and sleeve assembly having a plurality of operative capabilities and mounted in said through hole and chamber;

(1) a rotary cylindrical sleeve slidingly mounted in said chamber and said through hole, said sleeve having a radially outwardly projecting flange at the upper end thereof, and said flange having a recessed portion; and (2) a rotary plunger for transmitting the movement of the actuator to the push button, said plunger being slidingly mounted in said sleeve and having a flange at a first end thereof radially outwardly extending to one side and of a size equal to said recessed portion and being juxtaposed therewith, said flanges together abutting said flattened portion of said actuator shaft, and a second end of said plunger movably extending through the wall portion of the switch casing and terminating adjacent said push button;

(3) Whereby the rotation of said plunger and sleeve assembly within said through hole and chamber provide at least first and second operative capabilities of said switch assembly when said rotary actuator shaft is rotated;

(E) means for removably connecting the second end of the plunger to said push button in axially non-removable and rotatable fashion; and (F) a biasing element for biasing the sleeve upwardly whereby the contact elements of said switch may be forcibly separated from each other by the action of the biasing element.

2. A switch assembly as claimed in claim 1, wherein said removably connecting means comprises a generally U-shaped anchor flange defined on the end of the push button and a radially outwardly extending anchor flange formed at the second end of the plunger by grooving said second end of the plunger circumferentially inwardly, said anchor recess receiving the anchor flange therein through the opening corresponding in position to the top of a figure 'U'.

3. A switch assembly as claimed in claim 2, wherein said plunger including the radially outwardly extending anchor flange is of a cylindrical shape, the diameter of that circumferentially inwardly grooved portion of the plunger being smaller than the diameter of the remaining portion of the plunger.

4. A switch assembly as claimed in claim 1, 2 or 3, wherein the push button is coupled to the plunger such that a clearance is formed between the surface of the push button and one surface of the wall portion of the switch housing opposite to said actuator head to keep the push button in a position depressed a slight distance corresponding to the clearance.

* * * * *